United States Patent [19]
Kumpf

[11] 3,801,454
[45] Apr. 2, 1974

[54] PRESSURE-PROOF CONNECTION FOR NUCLEAR REACTOR PRESSURE VESSELS

[75] Inventor: Hermann Kumpf, Wendelstein, Germany

[73] Assignee: Kraftwerk Union Aktiengesellschaft, Mulheim (Ruhr), Germany

[22] Filed: Mar. 17, 1972

[21] Appl. No.: 235,525

[30] Foreign Application Priority Data
Mar. 19, 1971 Germany............................ 2113314

[52] U.S. Cl..................... 223, 220/55 E, 220/55 F, 220/55 G
[51] Int. Cl............................................. G21c 13/00
[58] Field of Search ........... 176/87; 220/55 E, 55 F, 220/55 G

[56] References Cited
UNITED STATES PATENTS
3,635,793  1/1972  Kolb et al. ............................. 176/87

FOREIGN PATENTS OR APPLICATIONS
1,084,319  9/1967  Great Britain........................ 176/87
1,594,967  7/1970  France................................... 176/87
1,525,051  4/1968  France................................... 176/87

Primary Examiner—Reuben Epstein
Attorney, Agent, or Firm—Herbert L. Lerner

[57] ABSTRACT

A pressure-proof connection is provided between a nuclear reactor pressure vessel cover member and a ring shaped member about the cover member. The connection comprises at least two rows of levers disposed one above the other positioned between the cover member and ring. The levers are moved by a cylindrical plate to either lock or unlock the cover and ring member.

4 Claims, 1 Drawing Figure

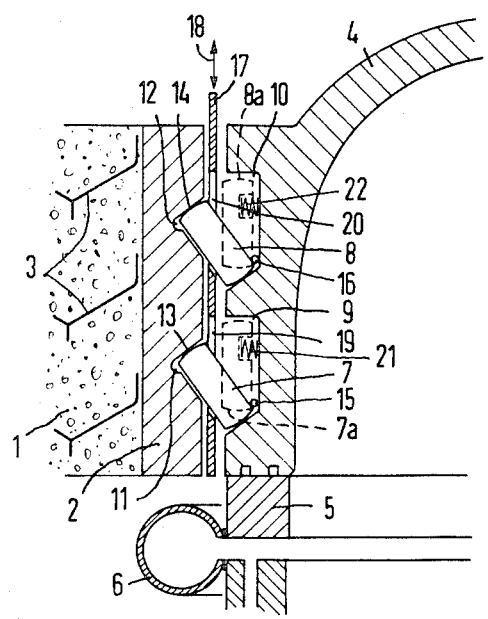

PRESSURE-PROOF CONNECTION FOR NUCLEAR REACTOR PRESSURE VESSELS

SPECIFICATION

The invention relates to a releasable or permanent pressure-proof connection of the cover or base formed of steel, concrete or other pressure-proof material of a nuclear reactor pressure vessel with the substantially cylindrical wall of the pressure vessel. It has been known heretofore to produce such a pressure-proof connection by means of a bone or tumbler-like lock (Knochenverschluss) which, when appropriately constructed, affords radial thermal expansion between the cover and the cylindrical casing. A possibility is presented thereby of connecting a cover or lid which is at the temperature of the coolant, i.e., hot, with the considerably cooler substantially cylindrical concrete casing.

The disadvantage of the heretofore known bone or tumblerlike lock is that very thick flange rings are needed to absorb and distribute the loads or stresses which are concentrated in a small space. Particularly, when the vessel casing is widened or expanded due to axial movement of the cover, the forces become even greater through the necessary inclined position.

It is accordingly an object of the invention to provide a pressure-proof connection for nuclear reactor pressure vessels which avoids the foregoibg disadvantages of the heretofore known connection of this general type.

With the foregoing and other objects in view, there is provided in accordance with the invention, pressure-proof connection of a nuclear reactor pressure vessel cover member or base member formed of steel, concrete or other pressure-proof materials with the substantially cylindrical wall of the pressure vessel comprising pressure-loaded lock means including at least two rows of spreading levers disposed one above the other between the substantially cylindrical wall and the respective member. In this manner, a uniform force distribution is attainable. The areas are already large enough to accommodate two or more rows of pressure-loaded locks.

In accordance with another feature of the invention, means comprising pins or joints are provided to effect a releasable fixation of the pressure-loaded lock that prevents the pressure-loaded members from falling out of the niches in which they are received.

Furthermore, a common displacement mechanism is provided in accordance with a further feature of the invention which, in the simplest case, comprises a cylindrical fitting plate formed with openings for the pressure-loaded members, the cylindrical lifting plate liftable for retracting the pressure-loaded members and lowered for spreading the pressure-loaded members.

In accordance with an additional feature of the invention, spring members are provided which augment the force of gravity by which the pressure-loaded members fall into their respective niches and which place the pressure-loaded members in correct starting position for performing a rolling motion.

Other features which are considered as characteristic for the invention are set forth in the appended claims.

Although the invention is illustrated and described herein as pressure-proof connection for nuclear reactor pressure vessels, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single FIGURE of the drawing which is a fragmentary sectional view, partly diagrammatic, of a cover and substantially cylindrical casing of a nuclear reactor pressure vessel showing the pressure-proof connection of the invention.

Referring now to the drawing, there is shown therein the upper part of a substantially cylindrical pressure vessel, more particularly, a concrete ring or cylinder 1, which is connected to the pressure vessel wall proper by means of tie rods. In the vicinity of the lock of the invention, a ring 2 is tightly connected to the concrete ring 1 with suitable tie rods 3 extending into the concrete mass. The cover 4 of the pressure vessel carries on the underside thereof an axially movable sealing member 5 provided with a yieldable split torus 6, a bellows or the like. For purposes of assembly, the cover 4 is initially forced downwardly beyong its normally closed position shown in the FIGURE, by compressing the torus 6. Thus, the pressure-loaded members 7 and 8 of the pressure-loaded lock fall in loosely into the niches or recesses 11 and 12 formed in the ring 2.

In the illustrated embodiment, two rows of the spreading levers, pressure-loaded members 7 and 8 are disposed one above the other around the periphery of the vessel cover 4. Naturally, the number of rows can be suitably increased. To augment the gravity force by which the pressure-loaded members 7 and 8, fall into the niches or recesses 12 and 13, and to place the pressure-loaded members into correct starting position to perform a rolling motion, spring members 21 and 22 are provided. As the cover 4 is being inserted or withdrawn, the pressure-loaded members 7 and 8 are pivoted into vertical position within recesses 8 and 10 as represented by the broken lines 7a and 8a. When the members 7 and 8 are in the illustrated position thereof represented by solid lines, the inner pressure causes the cover 4 to be pressed upwardly against the members 7 and 8, the latter, in turn, abutting, against the sloping surfaces 13 and 14, in the niches or recesses 11 and 12 formed in the ring 2.

A releasable fastening device by means of hinge pins or joints 15 and 16 which prevent the members 7 and 8 from falling out of the recesses 11 and 12, is shown in the FIGURE. This effect can also be achieved by other suitable structural members. Furthermore, the illustration shows a common displacement mechanism that is formed of a cylindrical lifting plate 17, which may be raised or lowered in respective directions of the double arrow 18. The cylindrical plate 17 of sheet metal, for example is formed with openings 19 and 20 through which the members 7 and 8 may extend. To retract the members 7 and 8, the plate 17 need only be lifted in the upward direction of the arrow 18, as viewed in the FIGURE.

The members 7 and 8 and their bearing surfaces form a roller-pair having preferably hardened contact surfaces. The production accuracy need not be extremely high since irregularities can be compensated for or equalized through local metal flow.

The invention permits a large area force transmission for small peak loads and relatively thin flange crosssections. The lock of the invention is equally suitable for covers made of concrete and steel, and that are either hot or cold. It is also possible to strengthen the entire cover connection in stressed condition with applied inner pressure, for example, by casting it in concrete. In that case, instead of a releasable lock, there is obtained a permanent lock wherein the cover is constantly prestressed. This is of a particular importance, if one wishes to permanently connect the bottom of the concrete pressure vessel to the substantially cylindrical casing of the pressure vessel, in this manner.

I claim:

1. Pressure-proof connection between a nuclear reactor pressure vessel cover member and a base member formed of steel, concrete or other pressure-proof materials and having a substantially cylindrical wall, comprising at least two rows of pressure-loaded levers disposed one above the other between said cylindrical wall and said cover member, said cylindrical wall having a plurality of niches into which said pressure-loaded levers are displaceable to form the pressure-proof connection, a cylindrical lifting plate disposed between said cylindrical wall and said cover, said lifting plate having openings for said pressure-loaded levers, said lifting plate being displaceable to engage said pressure-loaded levers and retract the latter from their engaged position in said niches in said cylindrical wall.

2. Pressure-proof connection according to claim 1, including releasable fixing means comprising a respective hinge pin securing said pressure-loaded levers to said cover member.

3. Pressure-proof connection according to claim 1, including releasable fixing means comprising a respective joint securing said pressure-loaded levers to said cover member.

4. Pressure-proof connection according to claim 1, including spring means for augmenting gravity force by which said pressure-loaded levers fall into said respective niches formed in said substantially cylindrical wall and for biasing said levers into correct starting position for performing a rolling motion.

* * * * *